(12) United States Patent
Miyasako (10) Patent No.: US 8,629,910 B2
(45) Date of Patent: Jan. 14, 2014

(54) IMAGE CAPTURE APPARATUS AND CONTROL METHOD THEREOF

(75) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 13/173,127

(22) Filed: Jun. 30, 2011

(65) Prior Publication Data

US 2012/0033091 A1    Feb. 9, 2012

(30) Foreign Application Priority Data

Aug. 9, 2010    (JP) ................................ 2010-179005

(51) Int. Cl.
*H04N 5/228* (2006.01)
*G03B 17/00* (2006.01)

(52) U.S. Cl.
USPC ......................................... 348/208.4; 396/55

(58) Field of Classification Search
USPC ................... 348/208.99, 208.1, 208.2, 208.4, 348/208.16, 208.7, 208.5, 208.12; 396/55
See application file for complete search history.

(56) References Cited

U.S. PATENT DOCUMENTS

| 6,734,901 B1* | 5/2004 | Kudo et al. ................. 348/208.4 |
| 7,522,188 B2* | 4/2009 | Tomita et al. ............ 348/208.11 |
| 7,583,889 B2* | 9/2009 | Miyasako ........................ 396/55 |
| 2005/0128309 A1* | 6/2005 | Tomita et al. .............. 348/208.7 |

FOREIGN PATENT DOCUMENTS

JP    4419466    2/2010

* cited by examiner

*Primary Examiner* — James Hannett
*Assistant Examiner* — Ahmed A Berhan
(74) *Attorney, Agent, or Firm* — Cowan, Liebowitz & Latman, P.C.

(57) ABSTRACT

An image capture apparatus comprises an image capture unit which photo-electrically converts an object image, a shake detection unit which detects a shake of the image capture apparatus, a motion vector detection unit which detects a motion vector, a reference value calculation unit which calculates a reference value serving as an output from the shake detection unit when the image capture apparatus stands still, a correction amount calculation unit which calculates a shake correction amount, and an image blur correction unit which corrects a blur of the object image, wherein the reference value calculation unit calculates the reference value based on an integrated value of the output from the shake detection unit, an integrated value of an output from the motion vector detection unit, and a variation of the output from the correction amount calculation unit in a predetermined period.

10 Claims, 6 Drawing Sheets

IMAGE CAPTURE APPARATUS AND CONTROL METHOD THEREOF

BACKGROUND OF THE INVENTION

1. Field of the Invention

The present invention relates to an image capture apparatus which has a function designed to correct a blur from a captured image caused by a camera shake or the like.

2. Description of the Related Art

With the recent downsizing of image capture apparatuses and the increase in the magnification of the optical system, a shake applied to the image capture apparatus or the like has become a major cause of degradation of the captured image. By focusing attention on this, there has been various image capture apparatuses with an image blur correction function for correcting a blur of captured image caused by a shake of the apparatus or the like.

Japanese Patent No. 4419466 discloses an image capture apparatus which includes an angular velocity sensor and corrects the blur of captured image by moving a shake-correction lens to cancel the output from the angular velocity sensor. The angular velocity sensor has a given output value (reference value) when no vibration is applied. To obtain a pure angular velocity applied to the image capture apparatus, the reference value needs to be subtracted from an output from the angular velocity sensor. However, this reference value fluctuates depending on the environment such as the temperature, so it is hard to accurately obtain the reference value. Japanese Patent No. 4419466 discloses a method for calculating the reference value more accurately.

However, the conventional technique disclosed in Japanese Patent No. 4419466 has the following problems. When the user performs a panning operation to change the shooting direction of the image capture apparatus, correcting even the motion component of the panning operation obstructs the panning operation of the user. In general, therefore, control to weaken the shake correction effect is performed at the time of panning. At this time, the result of the motion vector detection is given by the sum of the shake remaining component, which arises from an error of the above-mentioned reference value, and an image motion component, which arises from the weakening of the shake correction effect at the time of panning. The motion vector detection result at the time of panning does not indicate only the shake remaining component that arises from an error of the reference value, and no accurate reference value can be calculated.

SUMMARY OF THE INVENTION

The present invention has been made to solve the above problems, and increases the precision of the reference value calculation and to improve the performance of the camera shake correction even when the shake correction effect is intentionally weakened during panning or the like.

According to the first aspect of the present invention, there is provided an image capture apparatus comprising: an image capture unit which photo-electrically converts an object image to output an image signal; a shake detection unit which detects a shake of the image capture apparatus; a motion vector detection unit which detects a motion vector indicating a movement of an image from the image signal; a reference value calculation unit which calculates a reference value serving as an output from the shake detection unit when the image capture apparatus stands still, wherein the reference value calculation unit calculates the reference value based on an integrated value of the output from the shake detection unit, an integrated value of an output from the motion vector detection unit, and a variation of the output from the correction amount calculation unit in a predetermined period; a correction amount calculation unit which calculates a shake correction amount based on a difference between the output from the shake detection unit and the reference value; and an image blur correction unit which corrects a blur of the object image based on an output from the correction amount calculation unit.

According to the second aspect of the present invention, there is provided an image capture apparatus comprising: an image capture unit which photo-electrically converts an object image to output an image signal; a shake detection unit which detects a shake applied to the image capture apparatus; a motion vector detection unit which detects a motion vector indicating a movement of an image from the image signal; a reference value calculation unit which calculates a reference value serving as an output from the shake detection unit when the image capture apparatus stands still, wherein the reference value calculation unit calculates the reference value based on an integrated value of the output from the shake detection unit, an integrated value of an output from the motion vector detection unit, and a variation of the output from the position detection unit in a predetermined period; a correction amount calculation unit which calculates a shake correction amount based on a difference between the output from the shake detection unit and the reference value; an image blur correction unit which corrects a blur of the object image based on an output from the correction amount calculation unit; and a position detection unit which detects a position of the image blur correction unit.

According to the third aspect of the present invention, there is provided a method of controlling an image capture apparatus including an image capture unit which photo-electrically converts an object image to output an image signal, comprising: a shake detection step of detecting a shake of the image capture apparatus; a motion vector detection step of detecting a motion vector indicating a movement of an image from the image signal; a reference value calculation step of calculating a reference value serving as an output in the shake detection step when the image capture apparatus stands still, wherein the reference value calculation step, the reference value is calculated based on an integrated value of the output in the shake detection step, an integrated value of an output in the motion vector detection step, and a variation of the output in the correction amount calculation step in a predetermined period; a correction amount calculation step of calculating a shake correction amount based on a difference between the output in the shake detection step and the reference value; and an image blur correction step of correcting a blur of the object image based on an output in the correction amount calculation step.

According to the fourth aspect of the present invention, there is provided a method for controlling an image capture apparatus including an image capture unit which photo-electrically converts an object image to output an image signal, comprising: a shake detection step of detecting a shake applied to the image capture apparatus; a motion vector detection step of detecting a motion vector indicating a movement of an image from the image signal; a reference value calculation step of calculating a reference value serving as an output in the shake detection step when the image capture apparatus stands still, wherein the reference value calculation step, the reference value is calculated based on an integrated value of the output in the shake detection step, an integrated value of an output in the motion vector detection step, and a variation of the output in the position detection step in a predetermined period; a correction amount calculation step of calculating a shake correction amount based on a difference between the output in the shake detection step and the reference value; an image blur correction step of correcting a blur of the object image by driving an image blur correction unit based on an output in the correction amount calculation step; and a position detection step of detecting a position of the image blur correction unit.

Further features of the present invention will become apparent from the following description of exemplary embodiments with reference to the attached drawings.

DESCRIPTION OF THE EMBODIMENTS

An embodiment of the present invention will now be described in detail with reference to the accompanying drawings. Note that shake correction control in the lateral direction of an image will be explained throughout the description. Control in the longitudinal direction is the same as that in the lateral direction, and a description thereof will not be repeated.

Figure 1:
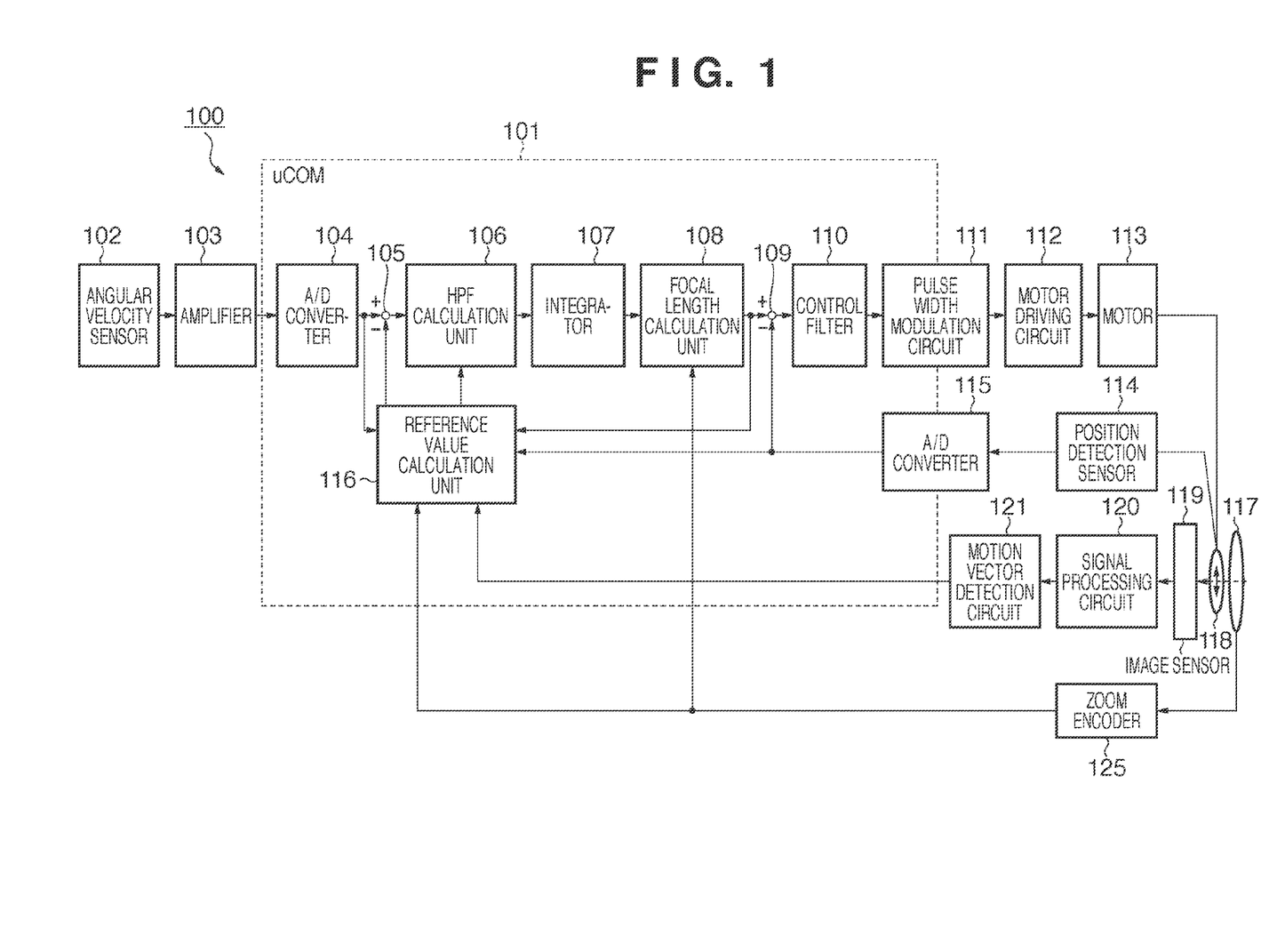
FIG. 1 is a block diagram showing the arrangement of an image capture apparatus according to an embodiment of the present invention.

FIG. 1 is a block diagram showing the arrangement of an image capture apparatus according to an embodiment of the present invention. The respective units and exemplary operation of an image capture apparatus 100 in FIG. 1 will be described in detail.

An angular velocity sensor 102 detects a shake applied to the image capture apparatus. For example, a vibration detected by the gyro angular velocity sensor as an angular velocity signal, a shake of the image capture apparatus itself caused by a camera shake, the swing of the body, or the like, and supplies the angular velocity signal to an amplifier 103. The amplifier 103 amplifies the angular velocity signal from the angular velocity sensor 102 into an optimum sensitivity, and supplies it to an A/D converter 104. The A/D converter 104 digitizes the angular velocity signal from the amplifier 103, and supplies the digital signal to an adder/subtracter 105 within a μCOM 101. An output from the A/D converter 104 will be defined as an "angular velocity sensor signal".

Output from the angular velocity sensor 102 when no vibration is applied fluctuates depending on the environment. The angular velocity sensor signal is obtained by superposing an output fluctuation in the absence of vibrations on a shake signal of the image capture apparatus 100. A reference value calculation unit 116 calculates the output from the A/D converter 104 when no vibration is applied to the angular velocity sensor 102, that is, "reference value" according to the following method, and supplies it to the adder/subtracter 105. The adder/subtracter 105 supplies the result of subtracting the reference value from the angular velocity sensor signal to an HPF calculation unit 106.

Figure 2:
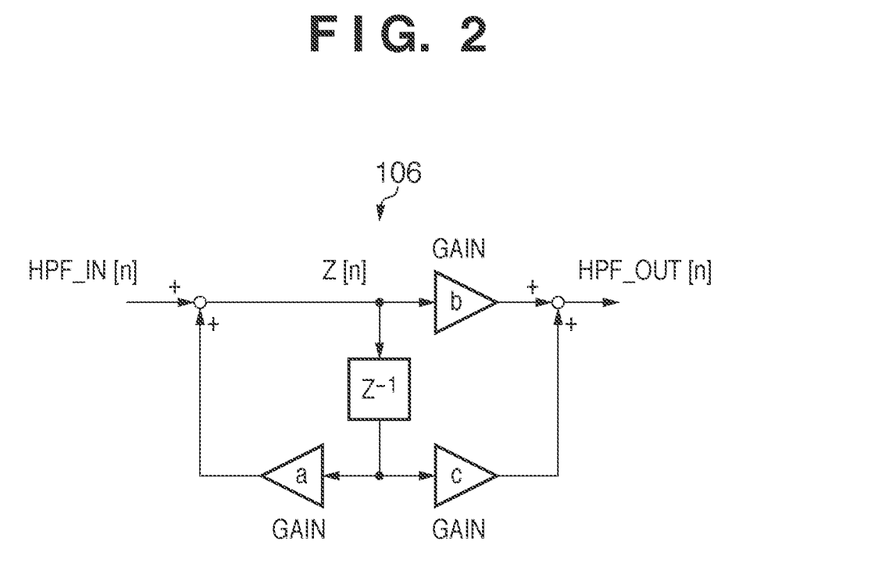
FIG. 2 is a circuit diagram exemplifying the arrangement of an HPF calculation unit 106.

FIG. 2 exemplifies the arrangement of the HPF calculation unit 106. The HPF calculation unit 106 has a general recursive digital high-pass filter as shown in FIG. 2. Gains a, b, and c mean that an input signal is multiplied by the coefficients a, b, and c, and then output. $Z^{-1}$ (delay element) delays an input signal by one sampling period and then outputs it. In the HPF calculation unit 106, let HPF_IN[n] be an input signal in the nth sampling, HPF_OUT[n] be an output signal, and Z[n] be a signal supplied to $Z^{-1}$ (to be referred to as an HPF intermediate signal (HPF intermediate value)). Then, the HPF_OUT[n] and Z[n] calculation values are given by $$HPF\_OUT[n]=bZ[n]+cZ[n-1] \qquad (1)$$

$$Z[n]=HPF\_IN[n]+aZ[n-1] \qquad (2)$$

By repetitively solving equations (1) and (2), the HPF calculation unit 106 attenuates the low-frequency component of a signal supplied from the adder/subtracter 105, and outputs the resultant signal.

Note that the coefficients a, b, and c can be set to arbitrary values in accordance with the shooting situation. For example, in still image shooting, an input signal is directly output by setting a=0, b=1, and c=0 not to attenuate a low-frequency shake signal by the HPF calculation unit 106. When a signal with a large amplitude in the low-frequency band is input at the time of panning or the like, the value a which determines the attenuation factor in the low-frequency band is changed to increase the attenuation factor (a is changed to a small negative value).

An integrator 107 integrates a signal output from the HPF calculation unit 106, and outputs the integration result as angular displacement data. A focal length calculation unit 108 (shake correction amount calculation unit) acquires the current zoom position information from a zoom encoder 125 configured to detect the zoom position for an imaging optical system 117 configured to perform zooming and focusing operations. The focal length calculation unit 108 calculates the focal length from the information. The focal length calculation unit 108 calculates the correction driving amount of a correction optical system 118 based on the focal length information and the above-mentioned angular displacement data. An output from the focal length calculation unit 108 will be defined as a "shake correction signal".

A control filter 110 receives the difference between the correction driving amount and the value (to be referred to as a "position detection signal") obtained when an A/D converter 115 digitizes an output from a position detection sensor 114 configured to detect the position of the correction optical system 118. A pulse width modulation circuit 111 converts an output from the control filter 110 into a PWM (Pulse Width Modulation) signal, and outputs the PWM signal. Based on the PWM output from the pulse width modulation circuit 111, a motor driving circuit 112 drives a motor 113 for moving the correction optical system 118. As a result, the incident angle of light incident on the image sensing surface of an image sensor 119 with respect to the optical axis changes, optically correcting a blur generated in a captured image. Note that the correction optical system 118 moves in a direction perpendicular to the optical axis of the imaging optical system 117 to correct the blur of an optical image. The correction optical system 118 may be a shift lens in the imaging optical system 117, or the image sensor 119 may move in a direction perpendicular to the optical axis.

A signal processing circuit 120 generates a video signal from captured image information obtained from the image sensor 119 configured to photo-electrically convert an object image and output an image signal. The signal processing circuit 120 then supplies the video signal to a motion vector detection circuit 121. The motion vector detection circuit 121 detects the motion vector of an image based on a luminance signal contained in the current video signal generated by the signal processing circuit 120 and a luminance signal contained in a video signal of an immediately preceding field.

The reference value calculation unit 116 calculates the reference value based on an angular velocity sensor signal output from the A/D converter 104, a position detection signal output from the A/D converter 115 or a shake correction signal output from the focal length calculation unit 108, and a motion vector signal output from the motion vector detection circuit 121.

The operation of the reference value calculation unit 116 in the embodiment will be described.

Figure 3:
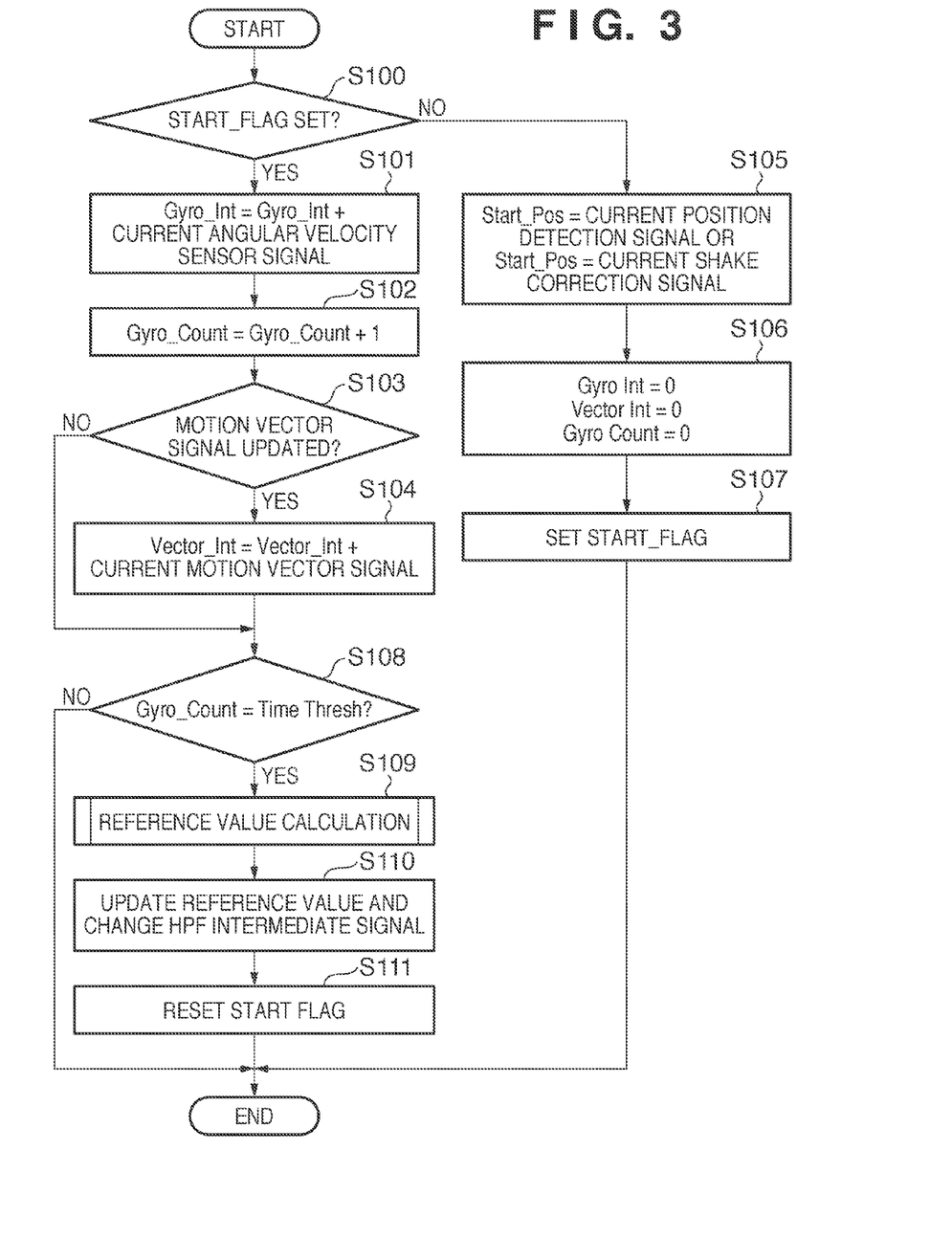
FIG. 3 is a flowchart for explaining processing performed by a reference value calculation unit 116.

FIG. 3 is a flowchart exemplifying processing by the reference value calculation unit 116. The processing in the flowchart shown in FIG. 3 is executed repetitively in every predetermined period such as $1/1000$ sec. In the processing of FIG. 3, first, the integrated value of the angular velocity sensor signal, the variation of the position detection signal or shake correction signal, and the integrated value of the motion vector signal (that is, the motion amount of the image) in a predetermined period are calculated. Then, the reference value is calculated from these calculated values. Details of this processing will be described.

In step S100, it is determined whether a flag START_FLAG indicating whether calculation of the reference value has started has been set. If START_FLAG has not been set, the process shifts to processing of step S105.

The current position detection signal or current shake correction signal is stored in a variable Start_Pos in step S105, and the process shifts to processing of step S106. In step S106, variables Gyro_Int, Vector_Int, and Gyro_Count (to be described later) are initialized to 0, and the process shifts to processing of step S107. START_FLAG is set in step S107, and the processing in the flowchart of FIG. 3 ends. Since START_FLAG has been set in step S107, it is determined in step S100 next time in the processing of FIG. 3 that START_FLAG has been set, and the process shifts to processing of step S101.

In the processing of step S101, the current angular velocity sensor signal is added to the variable Gyro_Int. The variable Gyro_Int is used to store the integrated value of the angular velocity sensor signal. After the processing of step S101, the process shifts to processing of step S102. In the processing of step S102, the variable Gyro_Count is incremented. The variable Gyro_Count is used to store the integration count of the angular velocity sensor signal. After the processing of step S102, the process shifts to step S103.

In step S103, it is determined whether the motion vector detection circuit 121 has updated the motion vector signal. If it is determined in step S103 that the motion vector has been updated, the process shifts to processing of step S108 after processing of step S104. If it is determined in step S103 that the motion vector has not been updated, the process shifts to processing of step S108 without performing processing of step S104.

In the processing of step S104, the current motion vector signal is added to the variable Vector_Int. The variable Vector_Int is used to store the integrated value of the motion vector signal. Only at the timing when the motion vector signal is updated in step S103, the process shifts to the processing of step S104 because of the following reason. The timing of motion vector detection by the motion vector detection circuit 121 is determined by the timing when the image sensor 119 generates captured image information. For example, in an NTSC image capture apparatus, the captured image information is generated at an interval of $1/60$ sec, and even the timing of motion vector detection by the motion vector detection circuit 121 is $1/60$ sec. In contrast, the interval of angular velocity sensor signal sampling by the A/D converter 104 is, for example, $1/1000$ sec which is shorter than the interval of motion vector detection. For this reason, if the processing in the flowchart of FIG. 3 is executed at the sampling interval of the angular velocity sensor signal, the motion vector is not updated in some period. In order not to execute the processing of step S104 during this period in which no motion vector is updated, the determination in step S103 is performed.

In step S108, it is determined whether the variable Gyro_Count is equal to a predetermined value Time_Thresh. If it is determined in step S108 that Gyro_Count is equal to Time_Thresh, the process shifts to processing of step S109. If it is determined in step S108 that Gyro_Count is different from Time_Thresh, the processing in FIG. 3 ends. The processes in steps S101 to S104 are repetitively executed until Gyro_Count=Time_Thresh (till the lapse of a predetermined time determined by Time_Thresh).

In step S109, the reference value is calculated. The reference value calculation processing in step S109 will be explained in more detail with reference to the flowchart of FIG. 4.

Figure 4:
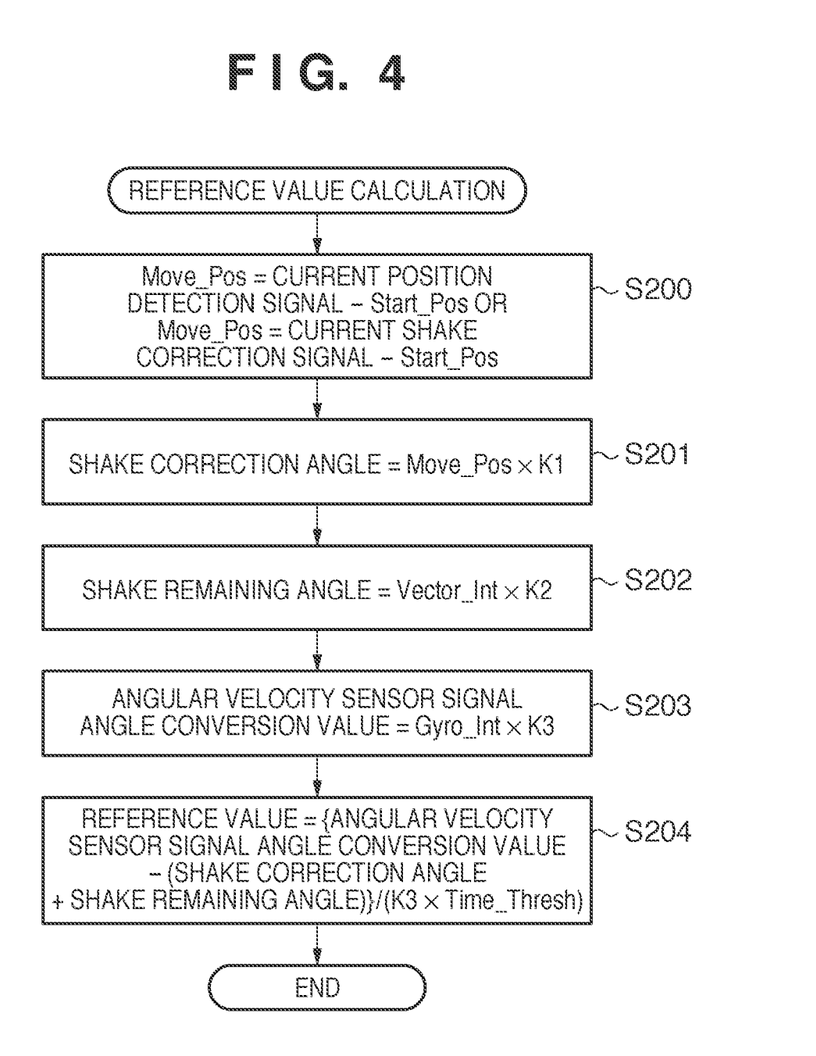
FIG. 4 is a flowchart for explaining detailed processing in step S109 in the flowchart of FIG. 3.

In step S200 in the flowchart of FIG. 4, the difference between the current position detection signal or current shake correction signal and the variable Start_Pos controlled in step S105 is stored in the variable Move_Pos. The variable Move_Pos indicates the amount by which the correction optical system 118 has moved, that is, the shake correction amount within a predetermined period determined by Time_Thresh. After the processing of step S200, the process shifts to step S201.

In step S201, the variable Move_Pos calculated in step S200 is multiplied by a coefficient K1. The coefficient K1 is used to convert the amount by which the correction optical system 118 has moved into an angle (to be referred to as a shake correction angle) by which the optical axis has tilted upon movement of the correction optical system 118. In step S201, the shake correction angle is calculated. In the embodiment, calculation of the shake correction angle uses an output from the A/D converter 115 or one from the focal length calculation unit 108, but is not limited to this. For example, an output from the integrator 107 or the HPF calculation unit 106 is also available. After the processing of step S201, the process shifts to processing of step S202.

In step S202, the variable Vector_Int calculated in step S104 of FIG. 3 is multiplied by a coefficient K2. The variable Vector_Int indicates the amount by which the captured image has moved (motion amount of the image) within a predetermined period determined by Time_Thresh. The coefficient K2 is used to convert the motion amount of the image into the tilt angle of the optical axis (same unit). In step S202, a value (to be referred to as a shake remaining angle) is calculated by converting the motion amount of the image into the tilt angle of the optical axis.

Note that the coefficient K2 can be obtained as follows. Letting f be the focal length of the imaging optical system 117, θ be the shake remaining angle, and x be the motion amount of the image, the following equations are established:

x=fθ

∴ θ=1/f×x

∴ K2=1/f

After the processing of step S202, the process shifts to processing of step S203. In step S203, the variable Gyro_Int calculated in step S101 of FIG. 3 is multiplied by a coefficient K3. The variable Gyro_Int indicates the integrated value of the Time_Thresh count of the angular velocity sensor signal within a predetermined period determined by Time_Thresh. The coefficient K3 is used to convert the integrated value of the Time_Thresh count of the angular velocity sensor signal into the tilt angle of the image capture apparatus 100. A value obtained by converting the integrated value of the Time_Thresh count of the angular velocity sensor signal into the tilt angle of the image capture apparatus 100 will be defined as the angular velocity sensor signal angle conversion value.

Note that the coefficient K3 can be obtained as follows. Letting Gyro_Int[n] be an angular velocity sensor signal for Gyro_Count=n, the angular velocity sensor signal angle conversion value for Gyro_Count=1 to Time_Thresh is the integrated value of the angular velocity sensor signal and can be given by the following equation:

$$\text{angular velocity sensor signal angle conversion value} = \sum_{n=1}^{Time\_Thresh} Gyro\_Int[n] \Delta t \quad (3)$$

where Δt is the interval at which the processing in FIG. 3 is repetitively performed. That is, K3=Δt. After the processing of step S203, the process shifts to processing of step S204.

In step S204, the reference value is calculated using the shake correction angle, shake remaining angle, and angular velocity sensor signal angle conversion value calculated in steps S201 to S203. A method for deriving a reference value calculation equation will be explained with reference to FIGS. 5A to 5E.

Figure 5A:
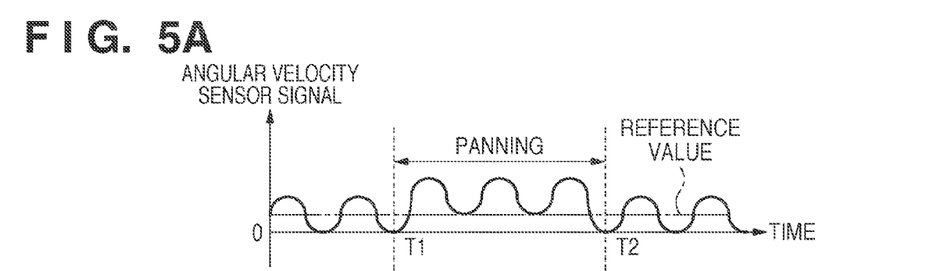
FIGS. 5A to 5E are charts for explaining processing in the flowchart of FIG. 4.

FIG. 5A is a chart showing the change of the angular velocity sensor signal output from the A/D converter 104 over time. The angular velocity sensor signal has a camera shake-superposed waveform with respect to a reference value indicated by a broken line. Panning starts at time T1 and ends at time T2. At the interval between time T1 and time T2, the low-frequency component of the waveform increases by a change of the angular velocity caused by panning.

Figure 5B:
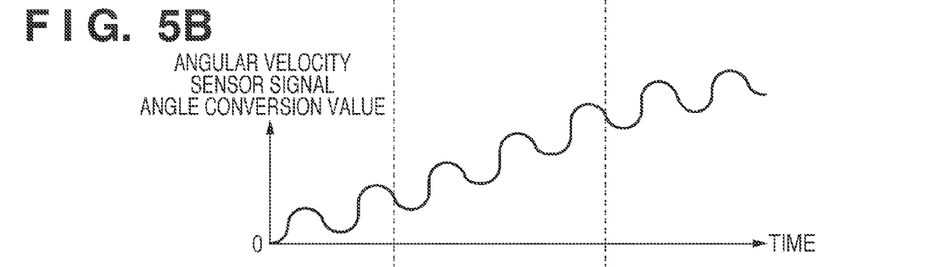

FIG. 5B is a chart showing the change over time of the angular velocity sensor signal angle conversion value that serves as the integrated value of the angular velocity sensor signal. The angular velocity sensor signal angle conversion value is obtained by integrating a signal in which the reference value and the low-frequency component of panning are superposed on the camera shake, and thus exhibits a waveform which keeps fluctuating in one direction with the lapse of time, as shown in FIG. 5B.

Figure 5C:
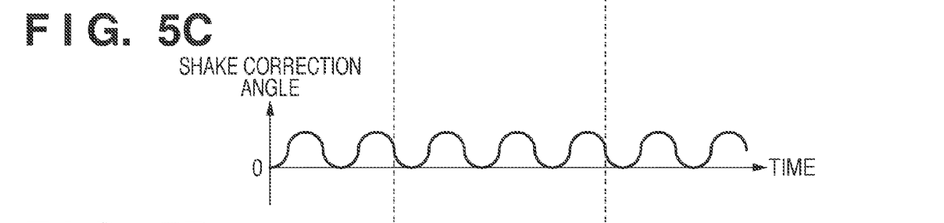

FIG. 5C is a chart showing the change over time of a signal obtained by converting the variation of the A/D converter 115 or focal length calculation unit 108 into a shake correction angle. The shake correction angle is generated using a low-frequency component-free signal obtained when an angular velocity sensor signal output from the A/D converter 104 passes through the adder/subtracter 105 and HPF calculation unit 106. As shown in FIG. 5C, the reference value and the low-frequency component of panning superposed on the camera shake in FIG. 5A are removed, and the shake correction angle serves as a signal for correcting only the camera shake.

Figure 5D:
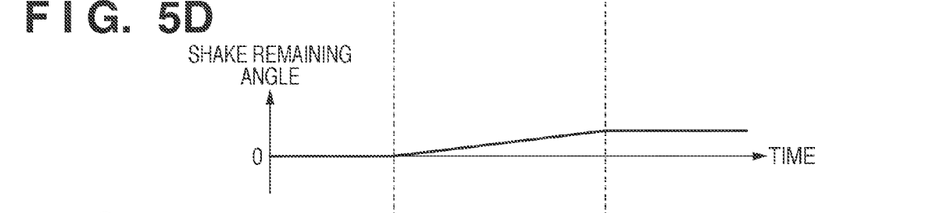

FIG. 5D is a chart showing the change over time of a value obtained by converting the integrated value of an output from the motion vector detection circuit 121 into a shake remaining angle. As described above, the shake correction amount is generated using a low-frequency component-free signal obtained when an angular velocity sensor signal output from the A/D converter 104 passes through the adder/subtracter 105 and HPF calculation unit 106. Hence, the low-frequency component of panning is not corrected by the correction optical system 118 and appears as the movement of a captured image. As shown in FIG. 5D, the shake remaining angle starts increasing from panning start time T1 and reaches a predetermined value at panning end time T2. In practice, even the shake remaining signal of the camera shake is contained in the shake remaining angle, but it will not be mentioned for descriptive convenience.

Figure 5E:
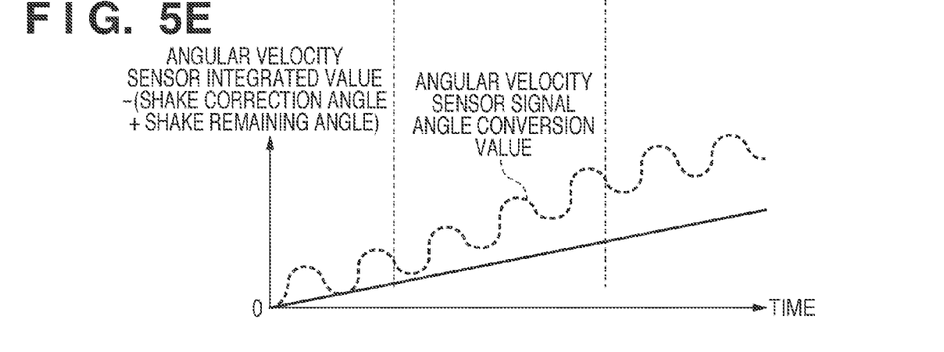

A solid waveform in FIG. 5E indicates a signal obtained by subtracting the shake correction angle in FIG. 5C and the shake remaining angle in FIG. 5D from the angular velocity sensor signal angle conversion value in FIG. 5B. As described above, the angular velocity sensor signal angle conversion value is obtained by integrating a signal in which the reference value and the low-frequency component of panning are superposed on the camera shake. The shake correction angle is a signal for correcting only the camera shake, and the shake remaining angle is a signal indicating the low-frequency component of panning. Therefore, a signal obtained by subtracting the shake correction angle in FIG. 5C and the shake remaining angle in FIG. 5D from the angular velocity sensor signal angle conversion value in FIG. 5B indicates only the angle conversion of the integrated value of the reference value. For a constant reference value as shown in FIG. 5A, the waveform is straight like the solid waveform in FIG. 5E. For comparison, a dotted waveform in FIG. 5E indicates an angular velocity sensor signal angle conversion value before subtracting the shake correction angle and shake remaining angle.

In equation (3), the angular velocity sensor signal is decomposed into the motion component Blur[n] of the image capture apparatus and the reference value Ref. For Gyro_Int[n]=Blur[n]+Ref, $$\sum_{n=1}^{Time\_Thresh} Gyro\_Int[n]\Delta t = \sum_{n=1}^{Time\_Thresh} Gyro\_Int[n]\Delta t + Ref \cdot Time\_Thresh \cdot \Delta t$$

From this, the angle conversion of the integrated value of the reference value shown in FIG. 5E can be given by the following equation:

$$\text{angle conversion of integrated value of reference value} = Ref \times Time\_Thresh \times \Delta t = Ref \times Time\_Thresh \times K3$$

As described above, the angle conversion of the integrated value of the reference value is a value obtained by subtracting the shake correction angle and shake remaining angle from the angular velocity sensor signal angle conversion value. Thus, the reference value Ref can be calculated as the differential value of the integrated value of the reference value by the following equation:

reference value={angular velocity sensor signal angle conversion value−(shake correction angle+shake remaining angle)}/(K3×Time Thresh)     (4)

Note that FIGS. 5A to 5E show waveforms in a long time containing even the panning time for descriptive convenience. In practice, however, a period (for example, 1/60 sec for the NTSC scheme) longer than the detection cycle of the motion vector detection circuit 121 suffices for calculation of the reference value by equation (4). This period is much shorter than the fluctuation cycle of the reference value, and the calculation can follow fluctuations of the reference value without any delay. In the embodiment, to calculate the reference value, the integrated value of the angular velocity sensor signal, the variation of the position detection signal or shake correction signal, and the integrated value of the motion vector signal (that is, the motion amount of the image) are calculated and converted into the "angle" unit. However, the conversion unit is not limited to "angle". For example, these values may be converted into the image motion amount unit or any other values with no physical meaning. The integrated value of the angular velocity sensor signal may be that of an output from the adder/subtracter 105. In this case, the reference value calculated by equation (4) is the variation of the reference value.

After calculating the reference value in step S204, the processing in FIG. 4 ends, and the process shifts to processing of step S110 in the flowchart of FIG. 3.

In step S110, the new reference value calculated in step S109 is supplied to the adder/subtracter 105, and the intermediate signal (intermediate value) held as the calculation result of every control sampling by the HPF calculation unit 106 is changed. The reason why the intermediate signal in the HPF calculation unit 106 is changed will be explained with reference to FIGS. 2 and 6A to 6C.

Figure 6A:
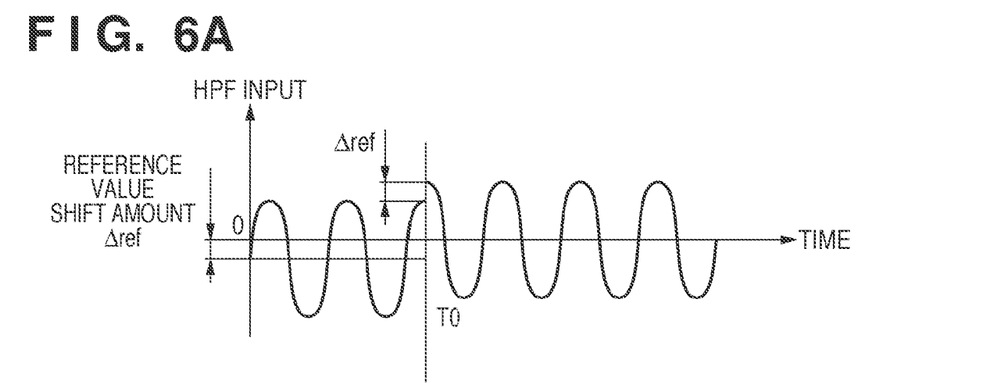
FIGS. 6A to 6C are charts for explaining control for the HPF calculation unit when the reference value calculation unit updates the reference value.

FIG. 6A is a chart showing a change over time in an input signal to the HPF calculation unit 106. Assume that the reference value shifts by Δref at time 0, as shown in FIG. 6A. Also assume that the reference value calculation unit 116 calculates a correct reference value at time T0 to update a reference value to be input to the adder/subtracter 105. Then, the input signal to the HPF calculation unit 106 changes discontinuously at time T0, as shown in FIG. 6A.

Assume that the reference value changes by Δref in the nth sampling in the HPF calculation unit 106 having the arrangement shown in FIG. 2. Letting HPF_IN[n]+Δref be the input signal, HPF_OUT[n] be the output signal, and Z[n] be a signal supplied to $Z^{-1}$ (to be referred to as an HPF intermediate signal), the HPF_OUT[n] and Z[n] calculation values are given by HPF_OUT[n]=bZ[n]+cZ[n-1]     (5)

Z[n]=HPF_IN[n]+Δref+aZ[n-1]     (6)

Equations (5) and (6) yield

HPF_OUT[n]=bHPF_IN[n]+bΔref+(ab+c)Z[n-1]     (7)

Figure 6B:
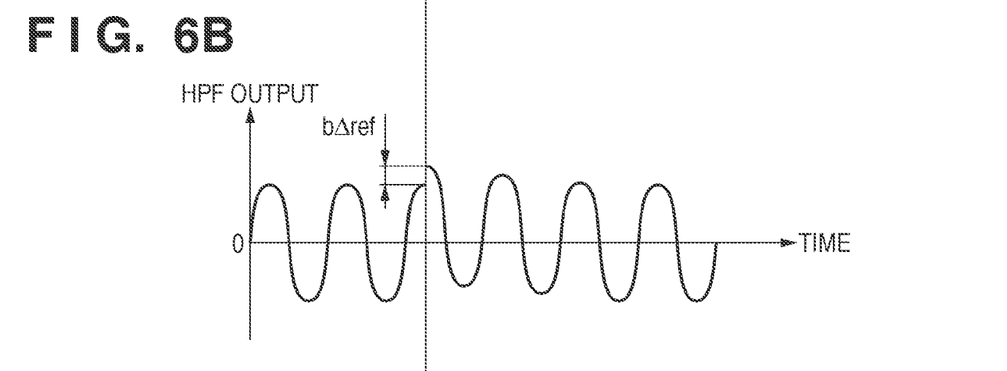

From equation (7), only supplying the new reference value calculated in step S109 to the adder/subtracter 105 generates the step-like change bΔref in an output from the HPF calculation unit 106. FIG. 6B is a chart showing a change over time in the output signal from the HPF calculation unit 106 when the input signal to the HPF calculation unit 106 shown in FIG. 6A is changed without changing the intermediate signal in the HPF calculation unit 106. If the output signal from the HPF calculation unit 106 fluctuates as represented at time T0 in FIG. 6B, the correction optical system 118 is undesirably driven to move the image though the image capture apparatus 100 does not shake.

To prevent this, when supplying the new reference value calculated by the reference value calculation unit 116 (assumed to be different by Δref from a previously calculated reference value) to the adder/subtracter 105, the intermediate signal Z[n-1] in the HPF calculation unit 106 is changed to Z[n-1]' represented by the following equation:

Z[n-1]'=Z[n-1]−Δref/a     (8)

Replacing Z[n-1] in equation (6) with Z[n-1]' in equation (8) yields $$Z[n] = \text{HPF\_IN}[n] + \Delta ref + aZ[n-1]' \quad (9)$$
$$= \text{HPF\_IN}[n] + \Delta ref + a(Z[n-1] - \Delta ref/a)$$
$$= \text{HPF\_IN}[n] + aZ[n-1]$$

Figure 6C:
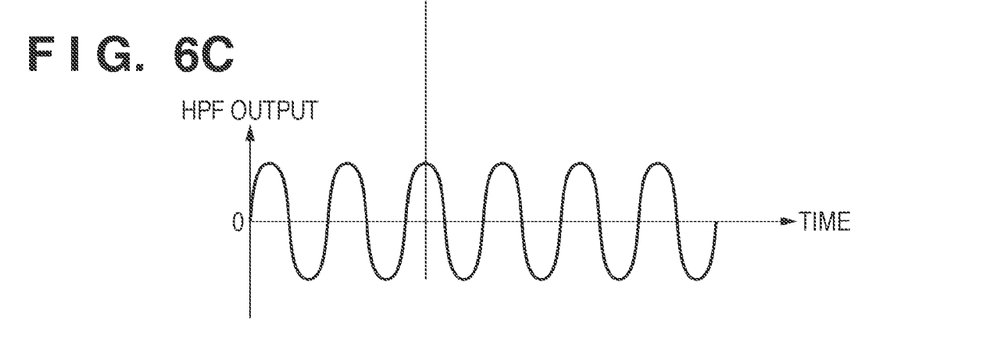

Then, equation (9) coincides with equation (2), and the output signal from the HPF calculation unit 106 coincides with one calculated by equation (1). In this way, the new reference value calculated in step S109 is supplied to the adder/subtracter 105, and the intermediate signal Z[n-1] in the HPF calculation unit 106 is changed as represented by equation (8). This can prevent generation of the step-like change in the output from the HPF calculation unit 106. FIG. 6C is a chart showing a change over time in the output signal from the HPF calculation unit 106 when the intermediate signal in the HPF calculation unit 106 is changed and the input signal to the HPF calculation unit 106 shown in FIG. 6A is changed. At time T0 in FIG. 6C, the output signal from the HPF calculation unit 106 does not fluctuate, unlike FIG. 6B as described above.

In step S110, therefore, the new reference value calculated in step S109 is supplied to the adder/subtracter 105, and the intermediate signal in the HPF calculation unit 106 is changed without affecting the output from the HPF calculation unit 106 by a change of the reference value. When the input signal to the HPF calculation unit 106 is directly output by setting a=0, b=1, and c=0 in FIG. 2 in still image shooting or the like, neither the reference value nor the intermediate signal in the HPF calculation unit 106 is changed in step S110. In a short period in still image shooting or the like, the reference value hardly fluctuates. In the embodiment, a high-precision reference value can be calculated in a period other than one during which a=0, b=1, and c=0. At a=0, b=1, and c=0, the reference value need not be changed in step S110 without any problem.

After the processing of step S110, the process shifts to processing of step S111. In step S111, START_FLAG is reset to calculate the next reference value, and the processing in FIG. 3 ends.

As described above, the embodiment can increase the precision of the reference value calculation even when the shake correction effect is intentionally weakened during panning or the like, which is a conventional subject. The embodiment can therefore improve the camera shake correction performance.

Although preferred embodiments of the present invention have been described above, the present invention is not limited to them and can be changed and modified in various ways without departing from the scope of the appended claims. For example, the correction optical system 118 may be an electronic correction means or may move the image sensor 119. The angular velocity sensor 102 may use an acceleration sensor or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-179005, filed Aug. 9, 2010, which is hereby incorporated by reference herein in its entirety.

What is claimed is:

1. An image capture apparatus comprising:
an image capture unit which photo-electrically converts an object image to output an image signal; a shake detection unit which detects a shake of the image capture apparatus;
a motion vector detection unit which detects, and provides as an output, a motion vector;
a reference value calculation unit which calculates a reference value serving as an output from said shake detection unit when the image capture apparatus stands still;
a correction amount calculation unit which calculates, and provides as an output, a shake correction amount based on a difference between an output from said shake detection unit and the reference value; and
an image blur correction unit which corrects a blur of the object image based on an output from said correction amount calculation unit,
wherein said reference value calculation unit calculates the reference value based on an integrated value of the output from said shake detection unit, an integrated value of an output from said motion vector detection unit, and a variation of the output from said correction amount calculation unit in a predetermined period.

2. The apparatus according to claim 1, wherein
said reference value calculation unit converts the integrated value of the output from said shake detection unit, the integrated value of the output from said motion vector detection unit, and the variation of the output from said correction amount calculation unit into the same unit, and
said reference value calculation unit calculates the reference value based on a differential value of a value obtained by subtracting, from a value obtained by converting the integrated value of the output from said shake detection unit into the same unit, a value obtained by converting the integrated value of the output from said motion vector detection unit into the same unit, and a value obtained by converting the variation of the output from said correction amount calculation unit into the same unit.

3. The apparatus according to claim 2, wherein the same unit is a unit indicating an angle.

4. The apparatus according to claim 1, wherein said correction amount calculation unit includes a digital high-pass filter including a delay element, and when said reference value calculation unit calculates the new reference value, changes an intermediate value held as a calculation result in every control sampling of the digital high-pass filter.

5. An image capture apparatus comprising:
an image capture unit which photo-electrically converts an object image to output an image signal;
a shake detection unit which detects a shake applied to the image capture apparatus;
a motion vector detection unit which detects, and provides as an output, a motion vector;
a reference value calculation unit which calculates a reference value serving as an output from said shake detection unit when the image capture apparatus stands still;
a correction amount calculation unit which calculates, and provides as an output, a shake correction amount based on a difference between an output from said shake detection unit and the reference value;
an image blur correction unit which corrects a blur of the object image based on an output from said correction amount calculation unit; and
a position detection unit which detects, and provides as an output, a position of said image blur correction unit,
wherein said reference value calculation unit calculates the reference value based on an integrated value of the output from said shake detection unit, an integrated value of an output from said motion vector detection unit, and a variation of the output from said position detection unit in a predetermined period.

6. The apparatus according to claim 5, wherein
said reference value calculation unit converts the integrated value of the output from said shake detection unit, the integrated value of the output from said motion vector detection unit, and the variation of the output from said position detection unit into the same unit, and
said reference value calculation unit calculates the reference value based on a differential value of a value obtained by subtracting, from a value obtained by converting the integrated value of the output from said shake detection unit into the same unit, a value obtained by converting the integrated value of the output from said motion vector detection unit into the same unit, and a value obtained by converting the variation of the output from said position detection unit into the same unit.

7. The apparatus according to claim 6, wherein the same unit is a unit indicating an angle.

8. The apparatus according to claim 5, wherein said correction amount calculation unit includes a digital high-pass filter including a delay element, and when said reference value calculation unit calculates the new reference value, changes an intermediate value held as a calculation result in every control sampling of the digital high-pass filter.

9. A method of controlling an image capture apparatus including an image capture unit which photo-electrically converts an object image to output an image signal, comprising:
a shake detection step of detecting a shake of the image capture apparatus;
a motion vector detection step of detecting, and providing as an output, a motion vector a reference value calculation step of calculating a reference value serving as an output in the shake detection step when the image capture apparatus stands still;
a correction amount calculation step of calculating, and providing as an output, a shake correction amount based on a difference between an output in the shake detection step and the reference value; and
an image blur correction step of correcting a blur of the object image based on an output in the correction amount calculation step,
wherein in the reference value calculation step, the reference value is calculated based on an integrated value of the output in the shake detection step, an integrated value of an output in the motion vector detection step, and a variation of the output in the correction amount calculation step in a predetermined period.

10. A method for controlling an image capture apparatus including an image capture unit which photo-electrically converts an object image to output an image signal, comprising:
a shake detection step of detecting a shake applied to the image capture apparatus;

a motion vector detection step of detecting, and providing as an output, a motion vector;

a reference value calculation step of calculating a reference value serving as an output in the shake detection step when the image capture apparatus stands still;

a correction amount calculation step of calculating, and providing as an output, a shake correction amount based on a difference between an output in the shake detection step and the reference value;

an image blur correction step of correcting a blur of the object image by driving an image blur correction unit based on an output in the correction amount calculation step; and a position detection step of detecting a position of the image blur correction unit, wherein in the reference value calculation step, the reference value is calculated based on an integrated value of the output in the shake detection step, an integrated value of an output in the motion vector detection step, and a variation of the output in the position detection step in a predetermined period.

* * * * *